(12) United States Patent
Shankar et al.

(10) Patent No.: US 7,604,742 B2
(45) Date of Patent: Oct. 20, 2009

(54) SOIL CONDITIONING PRODUCTS FROM ORGANIC WASTE

(75) Inventors: Hariharan S. Shankar, Mumbai (IN); Biplab R. Pattanaik, Cuttack (IN); Uday S. Bhawalkar, Pune (IN)

(73) Assignee: Indian Institute of Technology Bombay, Mumbai (IN)

( * ) Notice: Subject to any disclaimer, the term of this patent is extended or adjusted under 35 U.S.C. 154(b) by 349 days.

(21) Appl. No.: 11/125,748

(22) Filed: May 9, 2005

(65) Prior Publication Data
US 2005/0210941 A1    Sep. 29, 2005

Related U.S. Application Data

(63) Continuation of application No. 10/425,289, filed on Apr. 28, 2003, now Pat. No. 6,890,438.

(30) Foreign Application Priority Data

Apr. 26, 2002 (IN) .................. 383/MUM/2002
Apr. 26, 2002 (IN) .................. 384/MUM/2002

(51) Int. Cl.
*C02F 3/32* (2006.01)
*C05F 1/00* (2006.01)
*C05F 5/00* (2006.01)
*C05F 7/00* (2006.01)

(52) U.S. Cl. .................. 210/602; 210/610; 210/620; 119/6.7; 71/11; 71/14; 71/21

(58) Field of Classification Search .............. 210/602, 210/620, 610, 611, 631; 435/290.1; 119/6.7; 71/11, 14, 21
See application file for complete search history.

(56) References Cited

U.S. PATENT DOCUMENTS

| 2,680,069 | A | * | 6/1954 | Eweson ........................... 71/9 |
| 2,779,670 | A | * | 1/1957 | Burkett ..................... 71/64.07 |
| 3,635,816 | A |   | 1/1972 | Golub |
| 3,944,408 | A |   | 3/1976 | Postrihac |
| 3,961,603 | A |   | 6/1976 | Gaddie, Sr. |
| 4,108,609 | A | * | 8/1978 | Petzinger .................... 422/194 |
| 4,108,625 | A |   | 8/1978 | Okada |
| 4,161,158 | A |   | 7/1979 | Kartesz |

(Continued)

FOREIGN PATENT DOCUMENTS

AU    4513297 A1    6/1998

OTHER PUBLICATIONS

Bhawalkar, Converting Wastes Into Resources: Vermiculture Biotechnology, ILEIA Newsletter, 10.3, Oct. 1994.*

(Continued)

*Primary Examiner*—Fred Prince
(74) *Attorney, Agent, or Firm*—Morrison & Foerster LLP

(57) ABSTRACT

A process for conversion of organic wastes into biofertilizers such as soil conditioning agents of fertilizer grade, culture grade and soil grade is provided. Also provided is a process for conversion of organic wastes into material for converting waste water into reusable water. The invention provides methods for conversion of organic solid wastes to biofertilizers and reusable water in the presence of a geophagus earthworm *Pheretima elongata* culure to produce a variety of valuable soil conditioning products and reusable water.

32 Claims, 3 Drawing Sheets

Schematics of biofilter operation

U.S. PATENT DOCUMENTS

| | | | |
|---|---|---|---|
| 4,262,633 A | | 4/1981 | Taboga |
| 4,334,498 A | * | 6/1982 | Bedding .................... 119/6.7 |
| 4,552,726 A | | 11/1985 | Grappelli et al. |
| RE34,545 E | | 2/1994 | Kroeker |
| 5,389,257 A | | 2/1995 | Todd et al. |
| 5,432,088 A | * | 7/1995 | Kakuk et al. ............. 435/290.1 |
| 5,603,744 A | * | 2/1997 | K urner ........................... 71/9 |
| 5,820,759 A | | 10/1998 | Stewart et al. |
| 5,863,433 A | | 1/1999 | Behrends |
| 6,264,838 B1 | | 7/2001 | Nivens, Jr. |
| 6,277,274 B1 | | 8/2001 | Coffman |
| 6,890,438 B2 | | 5/2005 | Shankar et al. |

OTHER PUBLICATIONS

Menon, "Worms Recruited to clear Bombay's Rubbish", New Scientist, Dec. 1994.*

Sherman-Huntoon, Snapshots of Selected Large-Scale Vermicomposting Operations, North Carolina Cooperative Extension Service, Apr. 1997.*

International Search Report of PCT/IN03/00168.*

International Search Report of PCT/IN03/00168, mailed Dec. 18, 2003.*

American Public Health Association et al. eds. (1992). *APHA—Standard Methods for the Examination of Water and Wastewater*. 18th edition. APHA: Washington, D.C., pp. iii-xxxi. (Table of Contents).

Arceivala, S.J. (1998). *Wastewater Treatment for Pollution Control*. 2nd edition. McGraw-Hill Publising:New Delhi. pp. xi-xv. (Table of Contents).

Hach Co. (1997). *Hach Water Analysis Handbook*, 3rd edition. Loveland, Colorado, USA. pp. vii-xviii. (Table of Contents).

Lee, K.E. ed. (1985). *Earthworms: Their Ecology and Relationship with Soils and Land Use*. Academic Press: New York. pp. v-viii. (Table of Contents).

Merck Co. (1997). *Manual for Photometer SQ 118*. Located at <http://www.merck.de/servlet/PB/show/1282710/manual_sq_118_e_1.pdf> visited on Apr. 27, 2004. pp. 1-28.

Stumm, W. et al. eds. (1981). *Aquatic Chemistry—An Introduction Emphasizing Equilibria in Natural Waters*. $2^{nd}$ edition. Wiley Interscience: New York., pp. V-XIV. (Table of Contents).

Earthworms—Benefits, Nature's Way Resources, Sep. 1999.

Collection and Reprocessing of Organic Food Waste: A Feasibility Study, Nolan ITU Pty Ltd, May 1997.

Asthana G. P. (1977). "On The Nitrogenous Components in The Earthworm Pheretima-Elongata," *Indian Journal of Zoology*, 5(2):12-16 (ISSN: 0302-7562, Database BIOSIS Online Biosciences Information Service, Philadelphia, PA, US, Database accession No. PREV197866027623 XP002262032).

Krishnamoorthy R. V. et al. (1986). "Biological Activity of Earthworm Casts an Assessment of Plant Growth Promoter Levels in the Casts," *Proceedings of The Indian Academy of Sciences Animal Sciences*, 95(3)341-352, (Database BIOSIS Online Biosciences Information Service, Philadelphia, PA, US, Database accession No. PREV198783019292 XP002262030, ISSN: 0253-4118).

Shanthi, N. R. et al. (Oct. 1993). "Vermicomposting of Vegetable Waste" *Compost Science and Utilization* Fall 1993 (Oct. 1993), 1(4): 27-30, (Database COMPENDEX Online Engineering Information, Inc., New York, NY, US, Database accession No. EIP94021204266 XP002262031 & Compost. Sci. Util.).

Sihorwala, T. A. et al. (1997): "Effect Of Different Species Of Earthworm And Their Combination on Carbon-Nitrogen Ratio of Black Cotton Soil And Characterization ofVermicasting Powders Produced From Solid Waste Treatment By Earthworm Biotechnology," *Proceedings of the International Conference On Solid Waste Technology and Management*, 13th(vol. 2), Paper 7C/1, 1-9 , Database CA Online Chemical Abstracts Service, Columbus, Ohio, US, retrieved from STN Database accession No. 128:88252 CA XP002262033).

Wong, S. H. et al. (1991)."Vermicomposting in the Management of Pig-Waste in Hong Kong," *World Journal of Microbiology and Biotechnology*, 7(6):593-595, (ISSN: 0959-3993, Database BIOSIS Online Biosciences Information Service, Philadelphia, PA, US, Database accession No. PREV199293082297 XP002262034).

International Search Report mailed on Dec. 18, 2003, for PCT Patent Application No. PCT/IN2003/000168, filed on Apr. 24, 2003, published as WO 2003/091160, on Nov. 6, 2003, 6 pages total.

* cited by examiner

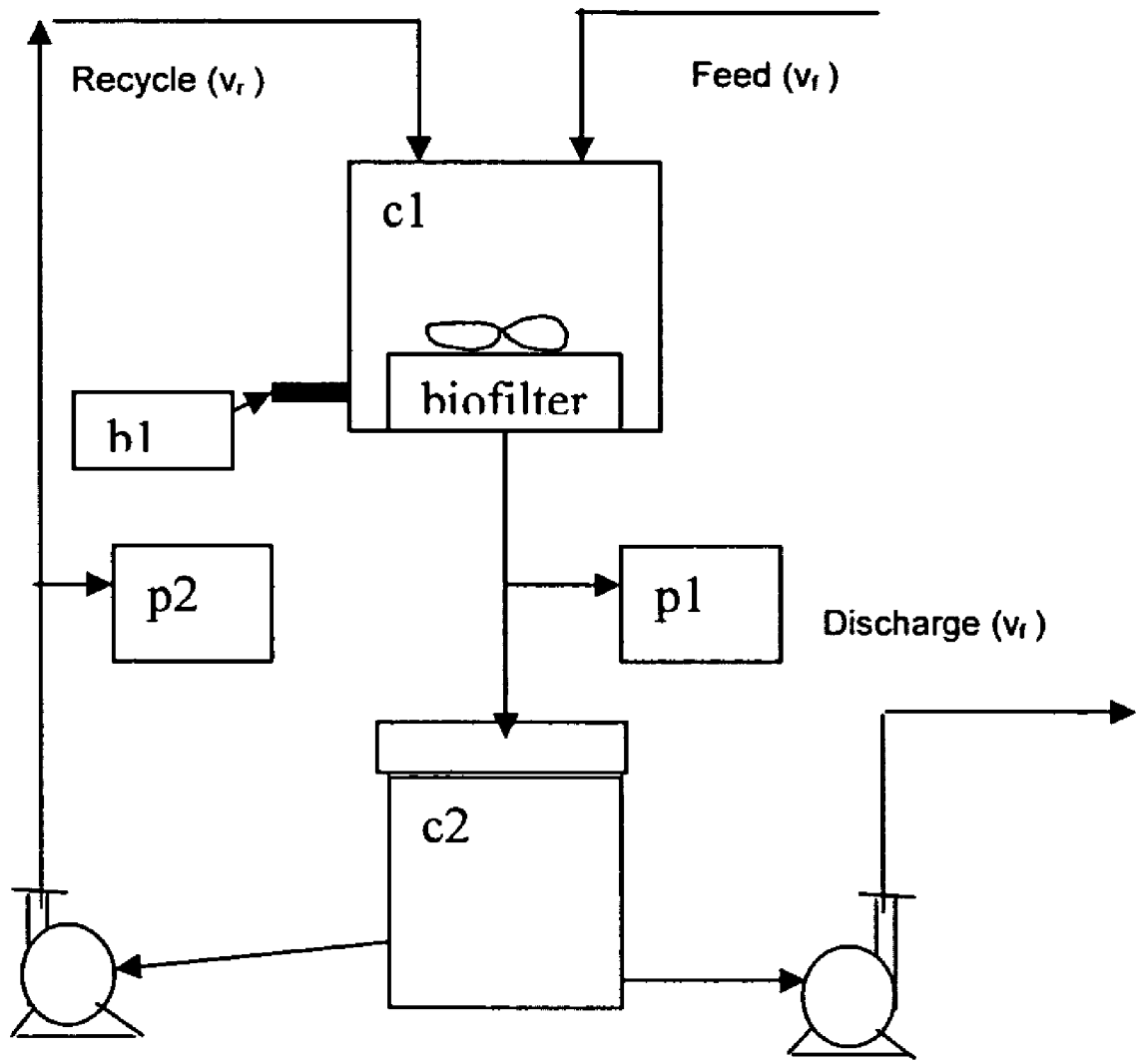
Figure 1: Schematics of biofilter operation

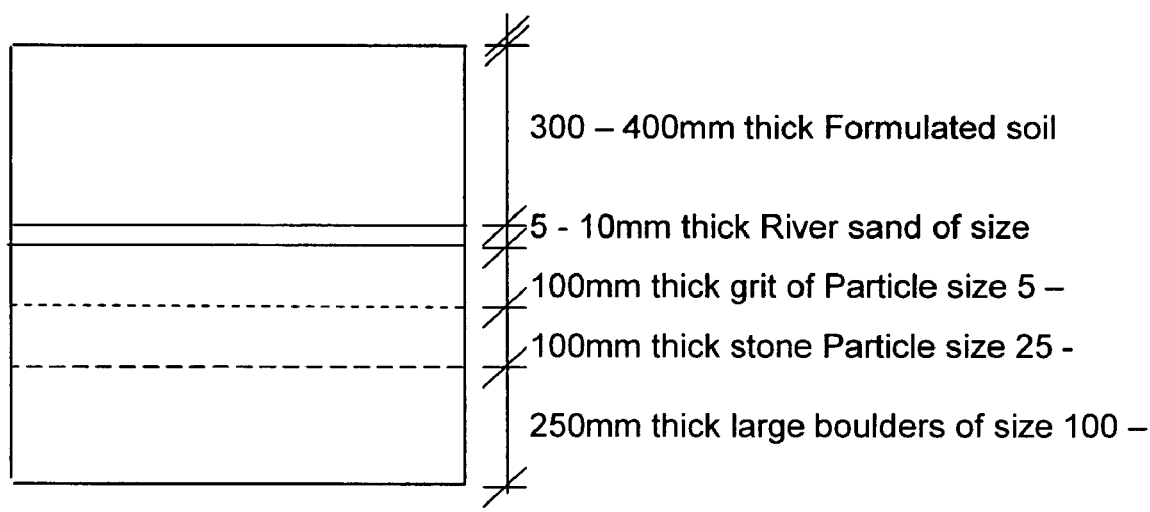
Fig 2: Biofilter Filling Details

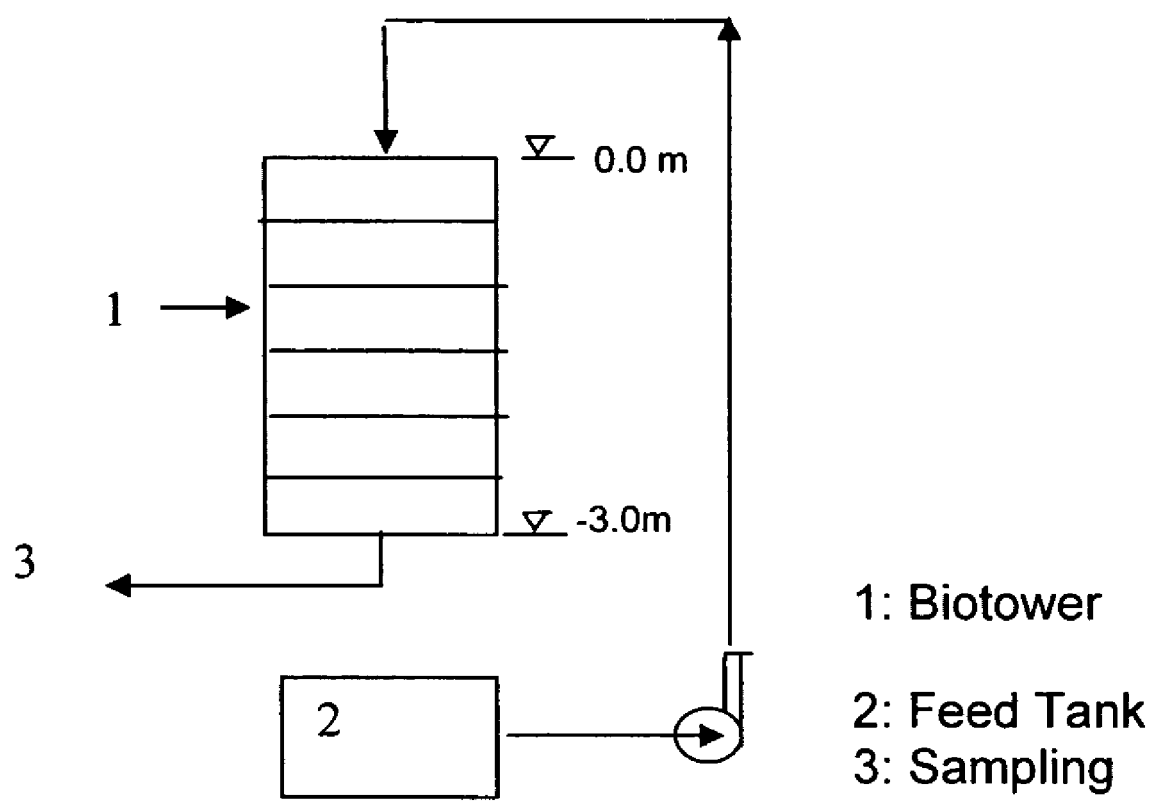
Figure 3: Schematics of a Biotower

SOIL CONDITIONING PRODUCTS FROM ORGANIC WASTE

CROSS-REFERENCE TO RELATED APPLICATIONS

This application is a continuation of U.S. application Ser. No. 10/425,289, which issued as U.S. Pat. No. 6,890,438, and claims priority of Indian Patent Application No. 383/MUM/2002 entitled "Process for Waste Water Renovation," filed Apr. 26, 2002, and Indian Patent Application No. 384/MUM/2002 entitled "Process for Treatment of Organic Wastes," filed Apr. 26, 2002, by the same inventors. Both applications are expressly incorporated herein by reference in their entirety.

TECHNICAL FIELD OF THE INVENTION

This invention relates to a process for conversion of organic wastes into biofertilizers such as soil conditioning agents of fertilizer grade, culture grade and soil grade and reusable water. In particular, the invention relates to a process for conversion of organic solid wastes to biofertilizers and reusable water in the presence of selective geophagus earthworms *Pheretima elongata* culture to produce variety of valuable soil conditioning products and reusable water by way of a simple and cost effective process.

BACKGROUND OF THE INVENTION

Human and animal habitations generate large quantities of wastes. The organic fraction of these wastes often accumulate in the neighborhood of habitations and their decomposition products affect detrimentally the quality of soil, water and air. Meanwhile, the demand for water has gone up and the need to renovate and reuse water has become imperative. In developing countries existing technologies for wastewater renovation are viable only in very large-scale operations and so cost of operation becomes prohibitive and lead to improper functioning and maintenance of plants (Arceivala, S. J., Wastewater Treatment for Pollution control, TMH publications New Delhi, India, 1998). Even the treated water in many cases breed mosquitoes thereby compounding the problem.

Many technologies are available to deal with organic wastes but most of these are energy intensive. Sanitary land filling is becoming unviable due to non-availability of landfill space. In biogas technology investments are large and subsequent liquid effluents consume much energy for disposal and solid product from such processes having low energy value for soil have limited market as fertilizer. Most current technologies face problems of acidity, culture fatalities and problems of process waste disposal. Composting has been practiced for over 50 years. However in the composting process bioenergy of the organic waste is lost and therefore the product retains very little energy for use in soil. In view of energy cost of composting operation, low value and low yield of product, the technology becomes useful if disposal is the objective. Organic waste conversion to biomass briquettes is a useful technology but the energy cost of drying and briquetting is high and hence such technology is also unviable in many cases.

Several technologies are available for treatment of organic liquid waste containing chemical oxygen demand (COD), biochemical oxygen demand (BOD), nitrogen, phosphorous, suspended solids, bacteria, color, odor etc. The presence of these pollutants in water is a form of toxicity and should therefore be substantially removed. Activated Sludge, Trickling filter, and Oxidation Ponds are examples of technologies currently in operation. All these technologies are energy intensive and viable only in very large scale. They produce residues whose disposal can create problems. Treated water is generally not fish compatible and such water discharged into drinking water sources endanger lives of dependent population (Bhawalkar, U. S., "Vermiculture Bioconversion of Organic Residues", *Ph. D. Thesis, Dept. of Chemical Engineering, IIT Bombay,* 1996; Pattanaik B. R., "Processing of Wastewaters in Soil Filters", *Ph.D. Thesis, Dept. of Chemical Engineering, IIT Bombay,* 2000). Land treatment of wastewater has been known for long. Here intermittent hydraulic loading of 0.001 $m^3/m^2$ per hr. is permissible and treated water is not easy to recover for reuse. Root zone treatment technology is similar to land treatment methods and have similar requirement and features (Nivens, Jr., U.S. Pat. No. 6,264,838, "Onsite Wastewater Recycling System"). Constructed wetland treatment technology has been in practice in many areas. In this case wetland-rock-aquatic ecology is engaged wherein subsurface flow brings about treatment. Hydraulic loading of 0.001-0.005 $m^3/m^2$.hr is observed (Behrends, U.S. Pat. No. 5,863,433, "Reciprocating Subsurface Flow, Constructed wetland for improving Wastewater Treatment").

Use of surface dwelling redworm *Eisenia foetida* in vermifilters and Vermicomposting is known (Lee, K. E., Earthworms—Their ecology and relationship with soils & land use, Academic Press, NY (1985)). However, there are major drawbacks of such processes and formulations leading to low yield of vermicompost. Moreover, it requires well-macerated excreta, preferably animal excreta, containing 1 percent or more protein nitrogen and 70 percent moisture. Also, there are problems of maintaining them in the filter. This is because they cannot live in their own excreta and as conditions arising from accumulation of waste products become adverse they migrate away. (Bhawalkar, "Vermiculture Bioconversion of Organic Residues", *Ph.D. Thesis, Dept. of Chemical Engineering, IIT Bombay,* 1996.; Pattanaik B. R., "Processing of Wastewaters in Soil Filters", *Ph.D. Thesis, Dept. of Chemical Engineering, IIT Bombay,* 2000) In order to prevent this migration converted material is to be separated and fresh material is to be added to the process. This leads to low loading rates thereby requiring large space for the vermicomposting process. Culture replacement is also necessary. In view of the generated acidic environment abnormal bio indicators of acidic environment do appear and the use of other chemical pest control measures become necessary. When the acidity becomes very high it becomes essential to unearth the entire space and prepare the place afresh leading to long turnover times, loss of productivity, etc. Such redworm cultures not being native to healthy soils their disposal becomes problematic. Other issues related to the use of *Eisenia foetida* (all surface dwelling varieties) are sudden loss of culture and pest incidence. (Bhawalkar U. S., Vermiculture bioconversion of Organic Residues, *Ph.D. thesis, IIT Bombay* 1996; Pattanaik, B. R., Waste Water Processing in Soil Filters, *Ph.D. thesis, IIT Bombay,* 2000). In general, available technologies do not use soil system because they tend to choke and become non-functional.

SUMMARY OF THE INVENTION

The present invention is directed to providing a process and a system for large scale processing of organic wastes including animal/human faeces using green technologies for organic waste conversion to biofertilizer and reusable water, herein referred to as Soil Biotechnology (SBT), without formation of objectionable process wastes thereby eliminating common operating problems of clogging, interruptions and waste disposal.

According to one aspect of the invention there is provided a process for treating organic waste for manufacture of biofertilizer and substantially non-toxic reusable water comprising: i) processing the organic liquid waste in a biofilter media comprising culture of geophagus earthworms *Pheretima elongata*, soil and bacterial cultures as defined herein with or without other mineral additive thereby providing substantially non-toxic reusable water; and ii) processing the organic solid waste selectively in the presence of cultures of geophagus earthworm *Pheretima elongata* in combination with bacterial cultures such as defined herein and a mineral source under controlled moisture content to provide a biofertilizer.

According to another aspect of the invention there is provided a process for producing biofilter media comprising earthworm culture comprising: a) collecting the geophagus earthworm *Pheretima elongata* from its natural habitat; b) developing a covered green space on the soil by providing 20-30 g/m² per day organics such as herein defined, ii) maintaining moisture at about 30-40%, and iii) adding the preferred mineral powder at less than 1000 micron @ 5-10 g/m² per day; and c) harvesting the culture after appropriate period of time (preferably following a high rainfall period, such as monsoon season) as sieved powder. The powder obtained is used as a source of earthworm culture. The sieved powder could be made of particles less than 500 microns in size.

According to another aspect of the invention there is provided a process for producing biofilter media comprising bacterial culture comprising: (a) developing the appropriate geophagus earthworm culture *Pheretima elongata* in a green space for 4-6 weeks by providing i) 20-30 g/m² per day organics such as hereindefined ii) moisture about 30-40% iii) preferred mineral powder of appropriate size (about less than 1000 micron) @ 5-10 g/m² per day; and (b) maintaining the mix above under conditions for developing the cultures and harvesting the culture as a sieved powder for use as a source of bacterial culture. The culture could be sieved to about 500 micron size.

In accordance with the general process of this invention, the single stage SBT process basically involves: (i) preparation of the geophagus earthworms culture *Pheretima elongata* and preparation of bacterial culture; (ii) preparation of the soil media to contain the geophagus earthworms Pheretima elongata; (iii) construction of an under drain first tank and a collection tank herein referred to as second tank; (iv) layering of the media over the first tank; (v) percolation of the organic waste through the layered media; (vi) collection of the treated water in the second tank; (vii) recirculation of the treated water to achieve the desired quality; and (viii) using bioindicators to monitor the reformed water at various stages of the process.

In one of the aspect of the invention mineral additive such as primary mineral powder or weathered mineral powder or iron-rich mineral powder of specified particle sizes and composition are added into the organic waste to be treated.

According to one aspect of the invention there is provided a biofiltration system for carrying out the process of treating organic liquid waste to provide substantially non-toxic reusable water comprising: i) a biofilter media comprising one or more filter media selectively comprising of anyone or more of culture of geophagus earthworm, bacterial cultures, soil with or without mineral additive; and ii) organic wastewater for processing through said biofilter in one stage or multiple stages and collect/supply the water thus processed substantially free of toxic content.

In another aspect of the invention, a multi stage process of organic waste renovation is carried out in a bio-tower wherein several single stage SBT processes are sequentially integrated.

One aspect of the invention provides a process for renovation of water from organic wastes—an integrated process combining Geophagous earthworms with potent bacterial cultures, minerals, water from organic wastes and soil.

Another aspect of the invention provides a process for easy removal of suspended solids without use of energy and to recover these solids as good quality fertilizer.

In another aspect of the invention, a multi stage process of the organic waste renovation is carried out in a bio tower wherein several single stage SBT processes are integrated with the option to re-circulate the treated water from any stage to any other stage as desired.

Another aspect of the invention provides a process wherein bacterial selection interaction is nurtured via earthworm culture so as to obtain a stable system despite large variation in input load.

Another aspect of the invention provides an engineered system for removal of nitrates and phosphates in water from organic wastes.

Another aspect of the invention provides a process for renovation at higher hydraulic loading rates.

Another aspect of the invention provides Biotower technology using the SBT system for producing reusable water and save on space wherein very high removal efficiencies are achieved.

Another aspect of the invention provides a technology for non-chemical cleaning of swimming pool waters.

Another aspect of the invention provides a process for renovation of water from organic wastes to fish compatible quality so that water bodies viz. lakes and rivers afflicted by pollution can be restored to health.

In another aspect of this invention the SBT process may be implemented in any existing conventional activated sludge plants and their like.

In another aspect of this invention the SBT process may be implemented in any existing conventional oxidation ponds and their like.

The process described herein removes one or more of pollutants viz. BOD, COD, ammonium nitrogen, nitrate nitrogen, suspended solids, phosphate, odor, colour, bacteria while substantially increasing dissolved oxygen and producing fish compatible renovated water and all this in a single integrated bed without producing sludge.

Another aspect of the invention is a process for the manufacture of effective fertilizer grade, culture grade and soil grade SBT products from organic wastes in the presence of selective species, which would facilitate such conversion without any environmental problems.

Another aspect of the invention provides a process with high oxygen transfer rates so as to ensure aerobic environment and have high removal of BOD, COD and $NH_4$—N and pathogens.

Yet another aspect of the invention provides a process for manufacture of effective SBT products from organic wastes using selective organisms that can operate at high rates without requiring extensive field area to carry out such process.

Yet another objective of the invention is to provide for the process of organic waste management that can be easily set up and run with minimum cost, operational constraints and with maximal operational advantages.

Yet Another aspect of the invention provides for process for organic waste conversion, which would achieve high bioenergy recovery efficiency.

Yet Another aspect of the invention provides a simple and cost effective process for organic waste conversion to produce SBT products in high yields.

Yet it is another object of the invention to produce pest resistant SBT products with high activity and shelf-life.

According to another aspect of the present invention there is provided a process for the manufacture of biofertilizer from organic waste comprising: providing a culture media comprising geophagus earthworm culture *Pheretima elongata* in a green space including bacterial culture as herein defined, moisture and a mineral source; processing the organic waste in the presence of said culture media under controlled moisture content to obtain the biofertilizer; and sieving to obtain the product of desired particle size.

According to another aspect of the present invention there is provided a process for the manufacture of biofertilizer from organic waste comprising: (i) providing (a) the mineral additives; (b) natural phosphate powder; (c) soil; and (d) bacterial culture; and (ii) processing the mix of (i) above with organic waste in a geophagus earthworm culture green space for sufficient period under controlled moisture content to thereby obtain the desired biofertilizer.

According to another aspect of the present invention there is provided a process for the manufacture of biofertilizer from organic waste comprising: providing a system of ridges and troughs; providing a culture media comprising geophagus earthworm culture *Pheretima elongata* as a green space including bacterial culture, moisture and a mineral source in said ridges having green plants to house said culture; and processing the organic waste in said system under controlled moisture content to obtain the biofertilizer in the presence of said culture media.

In one aspect of the invention an organic waste treatment system is provided, the system comprising: a material comprising organic waste; and a biofilter media comprising a geophagus earthworm *Pheretima elongata* culture, a bacteria culture, and optionally a mineral source.

The organic waste treatment system may comprise at least one trough with a ridge, the trough to receive and hold the biofilter media and the organic waste. In one embodiment, depth of the trough is between about 1-3 m.

In one embodiment, the organic waste treatment system comprises at least one first tank to receive and hold the biofilter media and the organic waste, the first tank having a first pipe to allow draining of the reusable water from the first tank. In one embodiment, the first pipe is located substantially towards bottom of the first tank.

In one embodiment, the organic waste treatment system further comprises a second tank to receive and collect the reusable water, the second tank connected to the first tank by the first pipe, the first pipe allowing the reusable water to flow from the first tank to the second tank.

In one embodiment, the first tank further includes a bottom surface, the bottom surface having a slope of 1/100 gradient, the bottom surface being impervious.

In one embodiment of the organic waste treatment system the first tank further holds at least one layer of a percolation media, the percolation media spread as a layer across the bottom surface of the first tank, the biofilter media spread as a layer on top of the percolation media in the first tank, the percolation media allowing percolation of the organic waste through the percolation media, the percolation through the percolation media progressively converting the organic waste.

In one embodiment, a biofiltration system comprises the first tank further includes a second pipe to recirculate processed water for further processing to obtain the processed water of desired quality.

In one embodiment, the percolation media comprises a layer of river sand, size of the river sand between about 2 and 3 mm, thickness of the layer of river sand between about 5 and 10 mm. In another embodiment, the percolation media further comprises a layer of grit, size of the particles of grit between about 5 and 10 mm, thickness of the layer of grit at 100 mm. In another embodiment, the percolation media further comprises a layer of thick stone, size of the thick stones between about 25 and 50 mm, thickness of the layer of thick stone about 100 mm. In another embodiment, the percolation media further comprises a layer of large boulders, size of the large boulders between about 100 and 200 mm, thickness of the layer of large boulder at 250 mm.

In one embodiment, the plurality of layers of percolation media are arranged in progressively increasing size of particles in each layer with smallest size particle layer at top and largest size particle layer at bottom of the first tank.

In one embodiment, the organic waste treatment system is adapted to run in batch mode of operation. In one embodiment, the organic waste treatment system is adapted to run in continuous mode of operation.

In one embodiment, the organic waste treatment system comprises a plurality of first tanks to receive and hold the biofilter media and the organic waste, the plurality of first tanks connected to each other by plurality of second pipes, the plurality of second pipes recirculating the processed water through the first tanks to further process the reusable water to obtain the reusable water of desired quality.

In one embodiment, the biofiltration system further includes plurality of bioindicators to monitor quality of processing of the organic waste at various stages of processing.

In one embodiment, the biofiltration system achieves a removal rate constant for BOD (up to 0.5/hr), COD (up to 0.4/day), ammonia (up to 1.0/hr), nitrate nitrogen (up to 0.1/hr), suspended solids (up to 0.5/hr), bacteria (up to 1.0/hr) with hydraulic loading of 0.02 to 0.1 cm/sq. m per hr.

BRIEF DESCRIPTION OF THE FIGURES

FIG. 1 shows the schematics of a biofilter operation.
FIG. 2 shows details for filling a biofilter.
FIG. 3 shows the schematics of a biotower.

DETAILED DESCRIPTION OF THE INVENTION

It has been surprisingly found by way of the present invention that effective soil conditioning agents of fertilizer grade, culture grade and soil grade SBT products and effective renovation of water from organic waste can be achieved by way of conversion of organic waste to environmentally friendly products when such conversion is carried out selectively in the presence of cultures of the geophagus earthworm *Pheretima elongata* in combination with bacterial cultures, selective mineral source and soil.

In accordance of this invention the process involves i) preparation of cultures of geophagus earthworm *Pheretima elongata* in combination with bacterial cultures; ii) In case of the water processing system, an additional step of preparation of the media is involved and iii) Using the above, solid waste or liquid waste is appropriately treated.

Thus according to one aspect of the invention there is provided a process for treating organic waste for manufacture of biofertilizer and substantially non-toxic reusable water comprising: processing the organic waste in a biofilter media comprising a culture of the geophagus earthworm *Pheretima elongata*, soil and bacterial cultures such as hereindefined with or without other mineral additives thereby providing substantially non-toxic reusable water; and processing the organic waste selectively in the presence of cultures of geophagus earthworm *Pheretima elongata* in combination with bacterial cultures such as herein defined and mineral source under controlled moisture content to thereby provide biofertilizer.

An appropriate geophagus earthworm culture *Pheretima elongata* is provided. The culture is developed in a covered green space by providing 20-30 gm/m$^2$ per day of organics such as ruminant animal dung which contains potent bacterial culture, or straw and leaf litter, moisture 30-40 percent and preferred mineral source powder of appropriate size at 5-10 g/m$^2$ per day. The culture is harvested for use as source culture of geophagus earthworms. This culture can be further powdered and sieved to about 500 micron size.

An appropriate bacterial culture is developed in a geophagus earthworm cultured green space provided with 20-30 gm/m$^2$ per day organics such as excreta of ruminant animals, preferably cows, buffaloes, bullocks, sheep, goats fed primarily on cellulosic residue, moisture about 30-40%, and preferred mineral powder at about 5-10 gm/m$^2$ per day. The culture is harvested for use as source culture of bacteria. The culture can be further powdered and sieved to about 1000 micron size.

In one embodiment of the invention, an appropriate formulated soil media 0.3-0.4 m thick produced by combining animal dung (15-50%), preferred mineral source of appropriate particle size (50-85%), bacterial and earthworm culture all processed in a green space for 7 days by maintaining 30-40% moisture is provided.

Preferred mineral source can be added in amounts of up to 200% w/w selected from sources containing silica (25-30% Si), alumina (6-8% Al), iron (1-6% Fe), Potassium (2-8%), Calcium (2-10%), Magnesium (1-3%) Phosphorous (0.003-0.1%) and also containing micronutrients.

Preferred mineral additive can comprise lime, and ferric sulfate used to reduce the phosphates to desired levels. Mineral additive can also be comprised of rock powder (0.3-0.6 kg/kg organic waste), natural phosphate powder (0.02-0.05 kg/kg organic waste) and soil (0.05-0.2 kg/kg organic waste). The rock powder can be a primary rock powder or a weathered rock powder. The mineral additive in combination with said biofilter media further facilitates removal of suspended solids.

Biofertilizer as used herein refers to material comprising micro-organisms which are able to perform biochemical functions including, but not limited to, fixing atmospheric nitrogen or solubilizing phosphorus, decomposing organic material and oxidizing sulphur in the soil. On application, a biofertilizer enhances the growth of plants, increases yield and also improves soil fertility.

BOD (biochemical oxygen demand) and COD (chemical oxygen demand) of the organic liquid waste are measured as per procedures specified in Standard Methods of Water and Waste-Water Analysis. (APHA—Standard methods of Examination of water and waste water, American Public Health Association, 18th edition, Washington, D.C. (1992)).

Green space as used herein refers to an area that is created or preserved for the purpose of growing living things.

Organic waste as used herein refers to material comprising both organic solid waste and organic liquid waste.

Vermicompost as used herein refers to resulting worm-worked material produced by earthworms.

I. Waste Water Renovation

This invention relates to a process for treating organic liquid waste (wherein the organic liquid waste is contained in municipal, domestic, agricultural, industrial waste containing residues ranging from animal excreta, human excreta, vegetable and fruit residues, straw and leaf litter, cooked food, protein residues, slaughter waste, hospital organic waste and the like) for providing substantially non-toxic reusable water involves processing the organic liquid waste in a biofilter media comprising culture of geophagus earthworms *Pheretima elongata*, soil and bacterial cultures such as herein defined with or without other mineral additive to provide substantially non-toxic reusable water.

Provision for distribution of organic waste is made by providing piped delivery to all parts of filter and distribution parts to deliver water uniformly. An underdrain of large boulders 0.3-0.4 m thick, 1/100-1/500 gradient sloping floor and a collection tank at a suitable location is also provided.

Process control is achieved by adjusting loading rates, addition of mineral powder so as to eliminate bioindicators of abnormality viz., mosquitoes, rats, odor, plant disease, etc.

This approach brings about purification of organic waste dependent on the process time, organic and hydraulic load.

In another embodiment of the invention mineral additives powder are added to facilitate renovation.

According to another aspect of the invention there is provided a biofiltration system for carrying out the process of treating organic liquid waste to provide substantially non-toxic reusable water comprising: biofilter media further comprising one or more filter media selectively comprising of anyone or more of culture of geophagus earthworm, bacterial cultures, soil with or without mineral additive; means to process organic liquid waste through said biofilter means in one stage or multiple stages and collect/supply the water thus processed substantially free of toxic content.

In another embodiment of the invention an SBT biotower for the renovation of organic waste is provided wherein the process is carried out in stages with each stage filled with typically 0.30-0.35 m of the media in the biotower. An embodiment of the system involves up to 10 stages with each stage having a free board of 1.8-2.0 m to maintain and also to carry out routine operation.

In another embodiment of the invention the processed water from any one of the stages in the bio tower may be re-circulated to any other stage to achieve selective denitrification by contacting the processed water with the layered stage that contains higher amounts of BOD/COD.

In another embodiment of the invention, the process for reforming organic liquid waste into reusable water achieves the removal rate constant for BOD of upto 0.5/hr, COD for upto 0.4/day, ammonia upto 1.0/hr, nitrate nitrogen of upto 0.1/hr, suspended solids of upto 0.5/hr, bacteria of upto 1.0/hr and hydraulic loading between about 0.02 to 0.1 cum/sq m per hour.

When soil systems are used for renovation of water from organic waste, the system tends to choke. The role of the earthworm-bacterial culture is to ensure uninterrupted operation. This is reflected in the high values of rate constants for the different solutes BOD, COD, Ammonium Nitrogen, Nitrate Nitrogen, Suspended solids, Color, Odor, bacteria that need to be removed as described in the examples.

The advantages of SBT processes are 1) land area saving can be designed 2) process engages local land resources 3) energy consumption is low as natural methods of oxygen supply is engaged 4) produces no residues for disposal which is a major issue in most waste water treatment plants. 5) very stable against load variations and 6) it is a green technology.

The unique features of this green technology are that the BOD, COD, ammonium nitrogen, nitrate nitrogen, suspended solid, colour, odour, bacteria, sufficient increase in dissolved oxygen, no residues for disposal are all made possible in a single tank constructed in the ground with its top open to atmosphere. In addition use of SBT achieves space saving, high removal efficiency, engages material that occurs locally, consumes no power for oxygen delivery to the system, leaves no residues for disposal and is very stable against shock loading. These advantages are unmatched by any known technology.

II. Conversion of Solid Waste to Biofertilizer

The process for manufacture of biofertilizer from organic solid waste (wherein the organics used are selected from municipal, domestic, agricultural, hospital, industrial waste and residues ranging from animal excreta, human excreta, vegetable and fruit residues, straw and leaf litter, cooked food, protein residues, slaughter waste, and the like) involves processing the organic waste selectively in the presence of cultures of geophagus earthworm *Pheretima elongata* in combination with bacterial cultures such as herein defined and mineral source under controlled moisture content.

According to one embodiment of the process of the invention involves: (a) processing the organic waste, preferred mineral source powder of a specific particle size range, soil, bacterial culture source under controlled moisture in a geophagus earthworm cultured green space for a required period; and (b) maintaining the mix for sufficient period to effect conversion to desired biofertilizer and sieving to a specified size range.

According to another aspect of the invention, yield of biofertilizer product of the invention is typically 200-1500 kg/ton raw waste depending on fertilizer grade, culture grade, soil grade biofertilizer products but depends on nature of feed.

Preferably, by adjusting additives and batch time can produce variety of products namely fertilizer to culture grade to soil grade product. Typically products contain about 5-30% organics, about 55-90% minerals, about 10-20% moisture and rich in soil bacterial population and also containing geophagus earthworm culture. Cycle time of 14 weeks is typical. Smaller cycle time require more additives, mechanical shredding and intensive management.

In another embodiment of the invention mineral additives such as primary rock powder of about 0.3-0.6 kg per kg waste, natural phosphate powder (about 0.02-0.05 kg./kg waste) and soil (about 0.05-0.2 kg/kg waste), bacterial culture (about 0.01 kg/kg waste) are added to enable organic conversion in a cultured green space to fertilizer grade, culture grade, or soil grade product.

Process control is achieved by adjusting loading rates, moisture levels and by addition of mineral source so as to prevent anaerobic environment and as well to eliminate bioindicators of abnormality. Process monitoring is achieved by observing bioindicators of abnormality viz. mosquitoes, rats, odour and plant health.

In accordance with another embodiment for large scale processing of organics the invention proposes the use of system of ridges and troughs of height/depth 1-3*m* to carry out the conversion of organic waste for biofertilizer using the aforesaid geophagus earthworm cultural green space.

The ridges can have the green plants that house the culture engaged in the process. For different capacities length of ridges and troughs can be adjusted. Higher loading as and when required can be achieved by adjusting ridge dimensions. The costs are low since energy inputs are low and thus would provide a cost-effective process for manufacture of biofertilizer.

In yet another embodiment of the invention, culture of the bacteria in the excreta of ruminant animals—e.g. cow, bullock, buffalo, goat, sheep, etc. preferably fed on cellulose-based feed are selected. The bacterial culture is further propagated by mixing excreta with preferred mineral source and developed further for about 4-6 weeks in geophagus earthworm cultured green space and harvested for use in different locations to give the appropriate bacterial culture.

In another embodiment of the invention the animal dung is mixed with preferred mineral source and propagated further in a geophagus earthworm culture green space for about 7-14 days to give soil grade product.

In yet another embodiment of the invention hospital organic waste can be disposed in geophagus earthworm cultured green space. The space is organized to receive the hospital organic waste for treatment using the invented process.

Fertilizer grade product obtained following the process of the invention contains typically about 20-30% organics, about 50-65% minerals, and about 15-20% moisture. The culture grade product contains about 5-10% organic, about 70-80% minerals, about 10-15% moisture. The soil grade product contains about 10-15% organic, about 65-75% minerals and moisture about 10-15%. All the products contain soil bacterial culture and geophagus earthworm culture.

EXAMPLES

The inventions are now described and illustrated with the following non-limiting examples. Examples 1-3 relate to waste water renovation and Examples 4-7 relate to treatment of organic solid waste.

Example 1

FIG. 1 shows a schematic of the system employed. A first tank c1 25.0 m×10.0 m×1.0 m below ground was constructed. A slope of 1/100 gradient was provided on the bottom surface of the first tank c1. The bottom surface was made impervious. A second tank c2 for collection of renovated water was provided. A pipe p1 connected the first tank c1 to the second tank c2. A second pipe p2 connected the second tank c2 back to the first tank c1 to recirculate the processed reusable water for further processing. This is done to achieve higher quality of reusable water. A biodindicator b1 is inserted at various stages of processing to monitor the quality of the organic waste during the various stages of the process. The filter fillings consisted of a 300-400 mm layer of formulated earthworm *Pheretima elongata* soil media and 0.3-0.4 m under-drain of stone rubble of sizes varying from 200 mm to 2 mm. The performance of filter operated in batch mode is given in Table 1. Hydraulic loading of 0.02-0.06 $m^3/m^2$ per hour has been observed. Table 2 shows the results of continuous operation. Biofilter filling details are given in FIG. 2.

In another embodiment, a plurality of first tanks c1 are engaged in the process of reforming the organic waste. Each of the plurality of first tanks c1 are connected to each other by plurality of first pipes p1. This helps in recirculating the water through different tanks to get higher quality of reusable water. The first tank is connected to second tank c2 by a second pipe p2. A plurality of bioindicators b1 are inserted into various stages of various tanks c1 to monitor the quality of the reusable water during the various stages of the process.

Removal of potent pollutants such as BOD, COD, $NH_4$—N, $NO_3$—N, phosphate (without using additive), suspended solids, color, odor, bacteria can be achieved. Dissolved oxygen improves significantly due to renovation. Fish inoculated in the filtrate collection tank showed no fatality during operation and storage of treated water, indicating fish compatible water is produced. Redox potential of water improves substantially from 50 mV to 800 mV indicating aerobic environment and pathogen destruction.

The typical values for the inlet (initial) and outlet (final) organic waste are shown in Tables 1 & 2. Variations in input do take place, but the desirable output water quality is always obtained by adjusting the process operating conditions.

It is relevant to note that good phosphate removal is observed without using additive. Wherever higher removal is needed various additives e.g., lime, ferric sulfate, etc. can be used to reduce the phosphates to desired levels.

The operation of this system under batch and continuous modes reveal that earthworm culture *Pheretima elongata* ensures clogging free operation, reproducible media reactivity and absence of abnormal bioindicators and water output parameters indicating excellent water quality. No fish fatality during the operation is a unique feature of the process.

TABLE 1

Batch Biofiltration results for *Pheretima elongata* cultured soil filters

| Item | Initial | Final |
|---|---|---|
| pH | 7.4 | 7.0 |
| $NH_4$ mg/L | 15 | 2 |
| $NO_3$ mg/L | 43 | 3 |
| Total N mg/L | 21 | 2 |
| SS mg/L | 100 | 30 |
| COD mg/L | 194 | 104 |
| BOD mg/L | 100 | 5 |
| $PO_4$ mg/L | 9.43 | 3.0 |
| Odor | ++ | — |
| Fish Survival | Nil | No fatality |
| DO mg/L | 0.0 | 5-5.5 |
| Bacteria (1/ml) | $10^9$ | $10^7$ |
| Color | ++ | — |
| Pests & insects | +++ | — |

Experimental conditions: $V_b$=84.0 m$^3$; $V_r$=10 m$^3$/hr; $V_f$=0.0 m$^3$/h, batch time=4 hr

TABLE 2

Continuous Biofiltration results for *Pheretima elongata* cultured Soil filter

| Item | Initial | Final |
|---|---|---|
| pH | 6.96 | 7.11 |
| $NH_4$ mg/L | 12.2 | 2.9 |
| $NO_3$ mg/L | 7.8 | 3.9 |
| Total N mg/L | 11.2 | 3.2 |
| SS mg/L | 708 | 15 |
| COD mg/L | 208 | 83 |
| BOD mg/L | 110 | 5 |
| $PO_4$ mg/L | 8.4 | 6.6 |
| Odor | ++ | — |
| Fish Survival | Nil | No fatality |
| DO mg/L | 0.0 | 4.5 |
| Bacteria (1/ml) | $10^9$ | $10^7$ |
| Color | ++ | — |
| Pests & insects | +++ | — |
| Redox Potential, mV | 50 | 800 |

$V_b$=84.0 m$^3$; $V_r$=2.4 m$^3$/hr; $V_f$=5.0 m$^3$/h.

Example 2

A schematic of a biotower is shown in FIG. 3. The results of the use of the biotower for renovation of water from organic waste are given in Table 3. A Biotower is constructed using 6 vessels of 30.0 L each mounted on a frame vertically one above the other. Each vessel contains the SBT media.

In a typical experiment carbonaceous substrate (glucose/sucrose) is charged form the top of the biotower at a predetermined flow rate. The outlet at the bottom of the filter is collected and analyzed for COD. Bioindicators b1 (ORP probes) were inserted all along the tower profile and response was recorded in data acquisition system.

The results show that very high efficiency removal of COD can be achieved. However the overall rate of COD removal for simple molecule (BOD) could be 0.3-0.5 kg/m$^3$ per day. The reactivity of the bed and earthworm activity all along the depth found to be uniform. In view of the multiple stages the water quality parameters (BOD, COD, Nitrogen, suspended Solids, color, odor, bacteria, virus) as required can be achieved.

TABLE 3

Results of Biotower studies using 6 stage *Pheretima elongata* cultured biotower

| RUN | Feed rate, ml/min. | COD inlet mg/L | COD outlet mg/L | pH feed | pH out |
|---|---|---|---|---|---|
| BT1 | 45 | 282 | 2-3 | 6.8 | 7.1 |
| BT2 | 45 | 668 | 6-17 | 7.1 | 7.5 |

Example 3

In these experiments a mineral source is contacted with the water from the organic waste containing the pollutant (natural & synthetic) in conical flask. The flask is mounted on a shaker incubator to facilitate solid-liquid contact typically for 30 min. The temperature is maintained at 28-30° C. The pollutant level in the liquid is determined by filtering off the solids from the sample reaction mixture. Results of sewage water contacted with mineral source are given below. Table 4 shows the effect of mineral source in wastewater renovation. The results show that use of mineral source in the range 250 mg/L brings about substantial removal of pollution level in the wastewater.

TABLE 4

Effect of additives for COD and nitrate removal

| SUBSTRATES | Mineral Powder* Additive mg/L | Initial mg/L | Final mg/L |
|---|---|---|---|
| Nitrates (as sewage) | 200 | 107 | 75.9 |
| Nitrates ($KNO_3$) | 66 | 105 | 74 |
| COD (as sewage) | 200 | 191 | 112 |

*Mineral source powder containing silica (20-30% Si), alumina (6-8% Al), iron (1-6% Fe), Potassium (2-8% K), calcium(2-10%), Mg (1-3%)

Example 4

100 kg of cow dung is taken. It is mixed with 100 kg of mineral source at ambient temperature of 25-28° C. Free Moisture content of the prepared mix is around 25%. The mix is incubated in an earthworm-cultured bed for 7 days and moisture is maintained by sprinkling water. During the sevenday process the mix is monitored for pH and pest incidence. At the end of 7 days it is sun dried and sieved to less than 500 microns.

The final product obtained is of the following characteristics: (1) fragrant soil smell while free moisture is maintained out around 10-15% (2) free flowing, (3) no pests and insects, (4) contains about 10-15% organics, about 65-75% minerals and 10-15% moisture. The soil product used as medium to grow potted plant shows vigorous plant growth indicating that the soil product is capable of being used as correction to eroded soils to restore productivity.

Example 5

100 kg of fresh food waste is taken and mixed with 50 kg of mineral source, 100 g of bacterial culture and is processed in a geophagus earthworm cultured green space. Moisture is maintained at 20 percent and processing continued for 14 weeks.

The final product has the following characterisations: (1) fragrant soil smell while free moisture is maintained at 15-20%, (2) free flowing, (3) no pests and insects, (4) contain about 5-10% organics, about 70-85% mineral and about 10-15% moisture. The culture grade product used as input to grow potted plants shows vigorous plant growth indicating that the culture grade product is capable of being used as correction to eroded soils to restore productivity.

Example 6

An organic waste processing plant to handle 16 tons per day of market organic waste is described. An area of 10800 $m^2$ is earmarked. The space is organized as 20 loading bays each of 30 M (8.0 m base–10.0 m top)×1.0 m deep. The green spaces are constructed on ground as ridges of size 30 M (2.0 m base–4.0 m top)×1.0 m high. The green space serves as the reservoir of culture required for the process. Suitable space for storage of additives and product are also provided. The entire space is cultured with geophagus earthworms. Suitable green plants to house the earthworm culture are planted on the ridges.

During loading, the waste is spread over the loading area. Mineral source in the range 0.3-0.6 kg/kg waste, soil in the range 0.1-0.2 kg./kg waste; bacterial culture 0.01 kg/kg waste, natural phosphates if required 0.02-0.05 kg/kg waste are sprinkled. Moisture is maintained at 20-30% on the soil. The loaded area is periodically turned manually. This may also be turned mechanically by a tractor and lumps are mechanically shredded.

A 14 weeks schedule for loading and as well 14 weeks schedule for curing/harvesting is engaged. During harvesting the material from the curing bays are dug out, screened and bagged. For the batches with any abnormal bioindicators more mineral powder is sprinkled and the material turned and allowed to process further for 2-3 days. The fertilizer grade product formed has moisture of 15-20%, 20-30% organic, 50-65% minerals and is free flowing.

Example 7

Hospital organic wastes are taken directly to geophagous earthworm cultured green space. The wastes are spread carefully on the processing area protected suitably via impervious lining. Soil in amount of 0.3-0.6 kg per kg waste and mineral powder @ 0.3-0.6 kg per kg waste are sprinkled. Loading is continued till the pit is full typically in 4 weeks. The processing is continued for 48 weeks. During processing the moisture in the pits was maintained at 30-40%.

The processed material is turned periodically. Non-biodegradables are removed and destroyed. The soil is ploughed, mixed with dry leaves and kerosene. The whole mass is ignited and allowed to burn. The next batch is then taken.

Analytical Methods:

Analytical Methods engaged for the analysis of COD, BOD, Ammonium Nitrogen, suspended solids, and color have been adopted from "Standard Methods of Water and Wastewater Analysis (APHA, Standard Methods for Examination of Water and Wastewater', American Public Health association, $18^{th}$ edition, Washington, 1992). Manual for Photometer SQ 118, E-Merck (Germany) 1997; Standard Methods of Water Analysis Handbook, Hach, USA (1997).

Bioindicators such as fish, mosquito, rats and flies have been identified visually and reported as our visual observation.

Bioindicators as a tool for assessment of pollution index of environment has been adopted from "Aquatic Chemistry" by Stumm, Werner; Morgan, J. J. in *Aquatic Chemistry—an introduction emphasizing equilibrium in natural waters, $2^{nd}$* edition, Wiley Interscience, NY (1981).

Bioindicators b1 are used at various stages of the processes to test for any toxic materials produced. Bioindicators such as fish, mosquito, rats, flies have been identified visually and reported as our visual observation. Bioindicators as a tool for assessment of pollution index of environment has been adopted from 'Aquatic Chemistry' (by Stumm, Werner; Morgan, J. J.; "Aquatic Chemistry—an introduction emphasizing equillibria in natural waters," $2^{nd}$ edition, Wiley Interscience, NY, 1981).

Tests for microbiological indicators like Coliform organisms, Staphylococci, *Kleibsella pneumonie, Salmonella, Shigella, Entamoeba hystolytica*, Polio virus, Hepatitis virus were carried out using methodology from Standard Methods of Water and Wastewater Analysis ("APHA-Standard Methods for Examination of Water and Wastewater," American Public Health Association, $18^{th}$ edition, Washington, 1992).

The performance of the different source of organic waste were noted as detailed under Table 5.

TABLE 5

Performance of different sources of organic waste

| Source | Cow dung | Food Waste | Market-Vegetables | Protein |
|---|---|---|---|---|
| Waste kg wet organic | 100 | 300 | 200 | 200 |
| Additive B kg | 100 | 30 | 50 | 40 |
| Additive L kg | — | 10 | — | 10 |
| Additive H kg | — | 10 | — | — |
| PH | 6.8-7.5 | 6.8-7.5 | 6.8-7.5 | 6.8-7.5 |
| Moisture in product (%) | 10-15 | 10-15 | 10-15 | 10-15 |
| Batch Time days | 7 | 200 | 100 | 100 |
| Product kg | 150 | 60 | 100 | 100 |
| Conditioner Product type | Soil | Culture | Fertiliser | Fertiliser |
| Residues | Nil | Nil | Nil | Nil |
| Pests on Product | Nil | Nil | Nil | Nil |
| Shelf life of Product (months) | 12+ | 12+ | 12+ | 12+ |

B - silica rich mineral
L - relatively low silica mineral
H - iron rich mineral

As would be evident from the results under Table 5, the material produced following the process of this invention find applications as a variety of soil conditioning agents of fertilizer grade, culture grade and soil grade. Further the products obtained are free of any harmful residues and have desirable shelf life. Equally important is the fact that the products are substantially free of toxic substances, which make it environment friendly and safe for use.

The redox potential of 900 mV indicates high oxygen availability and hence is a very healthy environment wherein the pathogen survival is unlikely. The nutrients in the waste get fixed in biomass and are internally recycled. The organic loading being small the nutrient levels in soil do not change much. Overall the results show that the procedure can handle hospital waste effectively.

Table 6 summarizes the results of treatment of hospital organic waste prepared as in Example 8. The results show that the hospital organic waste treated soil has characteristics similar to those of the control soil. Pathogens are not detected both in control soil and in treated samples.

TABLE 6

Total N and P levels in Soil after Hospital Waste (HW) Process

| Item | $E_h$ (mV) | N (%) | P (%) | Total Bacteria per g soil | Remarks |
|---|---|---|---|---|---|
| Control Soil | 900 | 0.01 | 0.001 | $10^7$-$10^8$ | * |
| Soil after 12 months HW | 900 | 0.01 | 0.001 | $10^7$-$10^8$ | * |
| HW Soil after curing in Flower bed | 900 | 0.01-0.005 | 0.001 | $10^7$-$10^8$ | * |
| HW Soil after heat treatment | 900 | 0.01-0.005 | 0.001 | Very small | * |

HW—Hospital Waste;
* Pathogens: not detected;
$E_h$ - Redox potential - high value indicates healthy soil The SBT process disclosed in this invention thus provides a cost effective and simple solution to the problem of organic waste management without creating any toxic wastes or issues of waste disposal. The product produced from this process is environment friendly and can be used as a soil-conditioning agent for diverse applications. It also provides a method for the effective utilisation of the recoverable bio-energy to produce products in high yields, and also offers avenues to systematically and cost effectively treat organic wastes from various sources such as hospitals, restaurants, markets, food, fermentation, agro-industries etc.

Overall this process for soil conditioning makes it possible to enhance the soil productivity in a cost effective manner in a global perspective.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. A biofertilizer comprising a material comprising organic waste contacted with a geophagous earthworm *Pheretima elongata* culture under conditions wherein said material is converted to a biofertilizer by said geophagous earthworm *Pheretima elongata* culture, wherein the *Pheretima elongata* culture is prepared by a process comprising: (a) providing the geophagous earthworm *Pheretima elongata*; (b) providing a covered green space; (c) adding said geophagous earthworm *Pheretima elongata* to said green space; and (d) providing conditions for said geophagous earthworm *Pheretima elongata* culture to develop, wherein said geophagous earthworm *Pheretima elongata* culture is provided as a biofilter medium, and wherein said biofilter medium further comprises (i) a bacteria culture; and (ii) a mineral source under controlled moisture content.

2. The biofertilizer of claim 1, wherein said mineral source is used in amounts up to 200% (w/w) and comprises silica (between about 25-30%, alumina between about 6-8%, iron between about 1-6%, calcium between about 2-10%, magnesium between about 1-3%, potassium between about 2-8%, phosphorous between about 0.003-0.1% and mineral based micronutrients.

3. The biofertilizer of claim 2, wherein said micronutrients comprise micro quantities of Zinc and Molybdenum.

4. The biofertilizer of claim 1, wherein said mineral source comprises:
rock powder of 0.3-0.6 kg/kg organic waste;
natural phosphate powder of 0.02-0.05 kg/kg organic waste; and
soil of 0.05-0.2 kg/kg organic waste.

5. The biofertilizer of claim 4, wherein said rock powder is selected from the group consisting of a primary rock powder and a weathered rock powder.

6. The biofertilizer of claim 4, wherein said mineral source comprises lime and ferric sulphate.

7. The biofertilizer of claim 1, wherein said organic waste is selected from the group consisting of municipal waste, domestic waste, agricultural waste, industrial waste, hospital waste, animal and human excreta, vegetable and fruit residue, cooked food, protein residue, leaf and straw litter, slaughter waste and combinations thereof.

8. A geophagus earthworm *Pheretima elongata* culture having the characteristics of a geophagus earthworm *Pheretima elongata* culture prepared by a process comprising: adding a geophagus earthworm *Pheretima elongata* to a green space under conditions for said geophagus earthworm *Pheretima elongata* culture to develop, wherein said geophagous earthworm *Pheretima elongata* culture is harvested by sieving as powder of less than about 500 micron size.

9. A bacteria culture having the characteristics of a bacteria culture prepared by mixing excreta from ruminant animals with a mineral source, wherein said excreta comprise bacteria wherein said bacteria culture is developed with a geophagus earthworm *Pheretima elongata* culture according to claim 8, in a green space for about 4-6 weeks.

10. The bacteria culture of claim 9, wherein said bacteria culture is harvested by sieving as a powder of less than 500 micron size.

11. The bacteria culture of claim 9, wherein said ruminant animals are fed on a cellulose based feed.

12. The green space of claim 11, wherein said organics comprise excreta of ruminant animals.

13. The green space of claim 12, wherein said ruminant animals are fed on a cellulose-based feed.

14. The biofertilizer of claim 1, wherein said biofertilizer is a culture grade of biofertilizer prepared by a method comprising:
combining said mineral source in amount of between about 0.3-0.6 kg/kg organic waste, a bacteria culture according to claim 13 in amount of about 0.01 kg/kg organic waste, and a soil processed by the geophagus earthworm

*Pheretima elongata* culture in amount of about 0.05-0.1 kg/kg organic waste to form a mixture;

loading organics in amount of about 0.1-0.5 kg/m² per day to said mixture;

maintaining 30-40% moisture during said process in said mixture; and incubating said mixture between about 180 and 220 days until said culture grade of said biofertilizer contains 5-10% organics, 70-85% minerals and 10-15% moisture enriched with said bacteria culture and said geophagus earthworm *Pheretima elongata* culture.

15. The biofertilizer of claim 1, wherein said biofertilizer is a fertilizer grade of biofertlizer prepared by a method comprising:

combining said mineral source in amount of between about 0.3-0.6 kg/kg organic waste, a bacteria culture according to claim 13 in amount of between about 0.01 kg/kg organic waste, and a soil processed by geophagus earthworm *Pheretima elongata* culture in amount of between about 0.05-0.1 kg/kg organic waste to form a mixture;

loading organics in amount of 1-5 kg/m² per day to said mixture;

maintaining 30-40% moisture during said process in said mixture; and incubating said mixture between about 56 and 70 days until said fertilizer grade of said biofertilizer contains 20-30% organics, 50-65% minerals and 15-20% moisture enriched with said bacteria culture and said geophagus earthworm *Pheretima elongata* culture.

16. The biofertilizer of claim 1, wherein said biofertilizer is a soil grade of biofertlizer prepared by a method comprising:

combining said mineral source in amount of about 1.0 kg/kg organic waste, a bacteria culture according to claim 13 in amount of about 0.01 kg/kg organic waste, and a soil processed by geophagus earthworm *Pheretima elongata* culture in amount of between about 0.05-0.1 kg/kg organic waste to form a mixture;

loading organics in amount of between about 1-5 kg/m² per day to said mixture;

maintaining between about 30-40% moisture during said process in said mixture, and incubating said mixture for a period of time until said soil grade of said biofertilizer grade contains 10-15% organics, 65-75% minerals, 10-15% moisture enriched with said bacteria culture and said geophagus earthworm *Pheretima elongata* culture.

17. The biofertilizer of claim 16, wherein said organics are excreta of ruminant animals.

18. The biofertilizer of claim 17, wherein said period of time between about 7 and 14 days.

19. The biofertilizer of claim 16, wherein said organics include finely divided organic food waste.

20. The biofertilizer of claim 19, wherein said period of time is between about 28 and 35 days.

21. The biofertilizer of claim 1, wherein said biofertilizer is prepared by a process further comprising:

combining said mineral source in amount of 0.3-0.6 kg/kg organic waste, bacteria culture according to claim 13 in amount of about 0.1 kg/kg organic waste, and a soil processed by geophagous earthworm culture in amount of between about 0.3-0.6 kg/kg organic waste to form a mixture;

loading organics to said mixture, said organics being hospital organic waste;

incubating said mixture between about 10 and 14 months;

maintaining 30-40% moisture during said process in said mixture;

burning said mixture with said leaf and straw litter; and recovering said biofertilizer after incubating said mixture for 28 weeks.

22. The bacteria culture of claim 9, wherein said mineral source comprises silica between about 25-30%, alumina between about 6-8%, iron between about 1-6%, calcium between about 2-10%, magnesium between about 1-3%, potassium between about 2-8%, phosphorous between about 0.003-0.1% and mineral based micronutrients.

23. The bacteria culture of claim 22, wherein said micronutrients comprise micro quantities of Zinc and Molybdenum.

24. A green space comprising an area created or preserved for the purpose of growing living things, said green space having the characteristics of a green space prepared by:

adding organics to a soil surface, said organics between about 20 and 30 g/m² of the soil;

maintaining a moisture level between about 30 and 40% in said green space; and adding a mineral source at a rate of between about 5 and 10 g/m² of the soil per day.

25. The green space of claim 24, wherein said mineral source comprises silica between about 25-30%, alumina between about 6-8%, iron between about 1-6%, calcium between about 2-10%, magnesium between about 1-3%, potassium between about 2- 8%, phosphorous between about 0.003-0.1% and mineral based micronutrients.

26. The green space of claim 25, wherein said micronutrients comprise micro quantities of Zinc and Molybdenum.

27. A reusable water having the characteristics of a resuable water prepared by a process comprising contacting waste water contacted with a geophagus earthworm *Pheretima elongata* culture under conditions wherein said waste water is converted to a reusable water by said geophagus earthworm *Pheretima elongata* culture, wherein the *Pheretima elongata* culture is prepared by a process comprising: (a) providing the geophagus earthworm *Pheretima elongata*; (b) providing a covered green space; (c) adding said geophagus earthworm *Pheretima elongata* to said green space; and (d) providing conditions for said geophagus earthworm *Pheretima elongata* culture to develop, wherein said geophagous earthworm *Pheretima elongata* culture is provided as a biofilter medium, and wherein said biofilter medium further comprises (i) a bacteria culture; and (ii) a mineral source under controlled moisture content.

28. The reusable water of claim 27, wherein said mineral source is used in amounts up to 200% (w/w) and comprises silica between about 25-30%, alumina between about 6-8%,, iron between about 1-6%, calcium between about 2-10%, magnesium between about 1-3%, potassium between about 2-8%, phosphorous between about 0.003-0.1% and mineral based micronutrients.

29. The reusable water of claim 28, wherein said micronutrients comprise micro quantities of Zinc and Molybdenum.

30. The reusable water of claim 27, wherein said mineral source comprises:

rock powder of 0.3-0.6 kg/kg organic waste;

natural phosphate powder 0.02-0.05 kg/kg organic waste; and soil 0.05-0.2 kg/kg organic waste.

31. The reusable water of claim 30, wherein said rock powder is selected from the group consisting of a primary rock powder and a weathered rock powder.

32. The reusable water of claim 30, wherein said mineral additive comprises lime and ferric sulphate.

* * * * *